United States Patent [19]

Suda et al.

[11] Patent Number: 4,555,169
[45] Date of Patent: Nov. 26, 1985

[54] FOCUS DETECTING DEVICE FOR A CAMERA

[75] Inventors: Yasuo Suda; Akira Akashi; Akira Ishizaki; Akira Hiramatsu, all of Yokohama; Keiji Ohtaka, Tokyo, all of Japan

[73] Assignee: Canon Kabushiki Kaisha, Tokyo, Japan

[21] Appl. No.: 648,244

[22] Filed: Sep. 7, 1984

[30] Foreign Application Priority Data

| Sep. 13, 1983 | [JP] | Japan | 169915 |
| Sep. 13, 1983 | [JP] | Japan | 169916 |
| Sep. 13, 1983 | [JP] | Japan | 169917 |
| Sep. 13, 1983 | [JP] | Japan | 169918 |
| Sep. 13, 1983 | [JP] | Japan | 169919 |

[51] Int. Cl.[4] ............................................. G03B 3/00
[52] U.S. Cl. ................................................ 354/407
[58] Field of Search ............................... 354/402–409, 354/152, 479, 480

[56] References Cited

FOREIGN PATENT DOCUMENTS

| 95221 | 10/1977 | Japan . |
| 40919 | 3/1982 | Japan . |
| 88116 | 5/1982 | Japan . |
| 187416 | 11/1982 | Japan . |
| 54323 | 3/1983 | Japan . |
| 78128 | 5/1983 | Japan . |

*Primary Examiner*—William B. Perkey
*Attorney, Agent, or Firm*—Fitzpatrick, Cella, Harper & Scinto

[57] ABSTRACT

In an in-focus state detection device for a camera for forming a plurality of images based on light fluxes transmitted through different areas of a pupil of an imaging lens and detecting the state of the imaging lens based on a relative positional relationship of the images, an optical system for forming the images and a sensor for sensing the images are constructed in a unit through two opposing mirrors to allow ready mounting of the optical system and the sensor, and the positions of the optical system and the sensor are adjusted through the unit member.

24 Claims, 12 Drawing Figures

Fig. I(a)
PRIOR ART
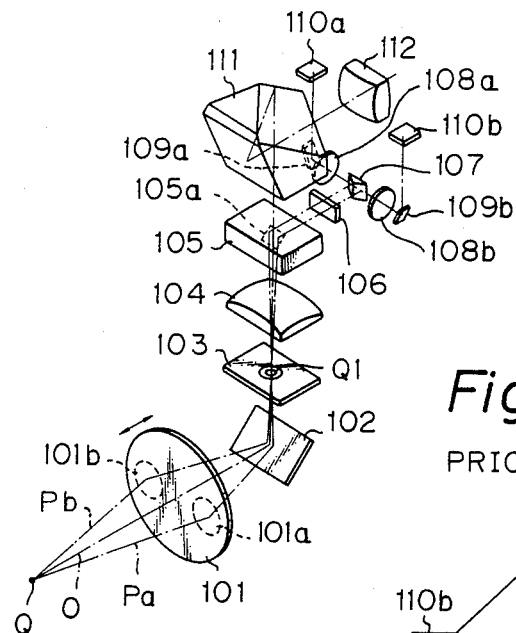
Fig. I(b)
PRIOR ART
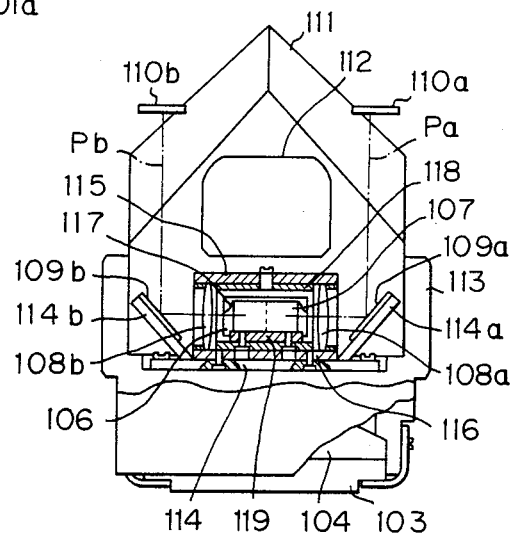

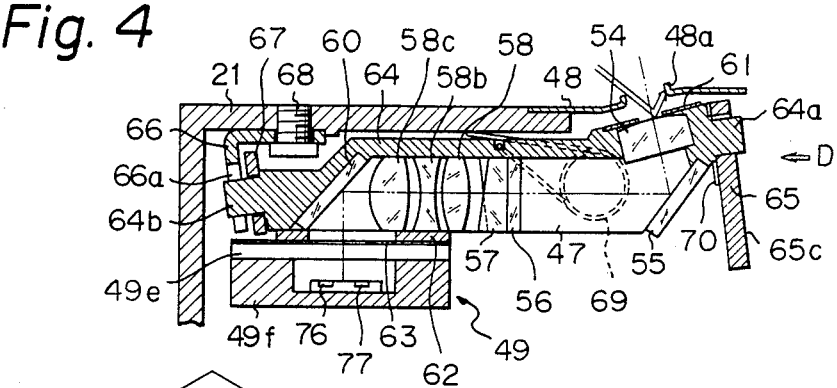
Fig. 4
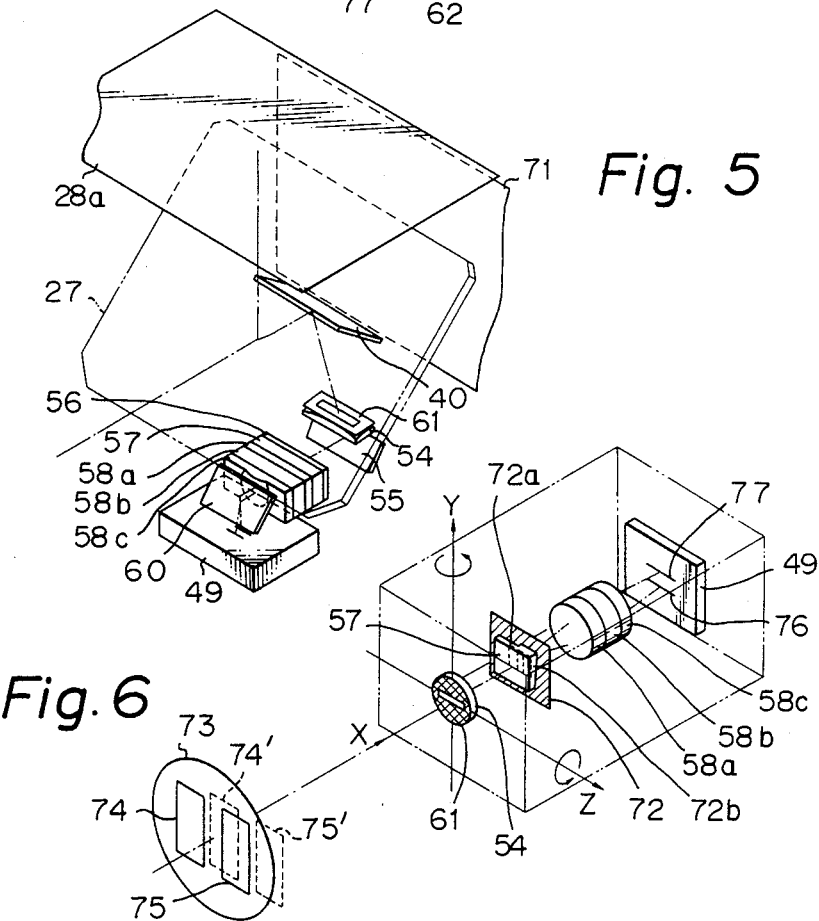
Fig. 5
Fig. 6

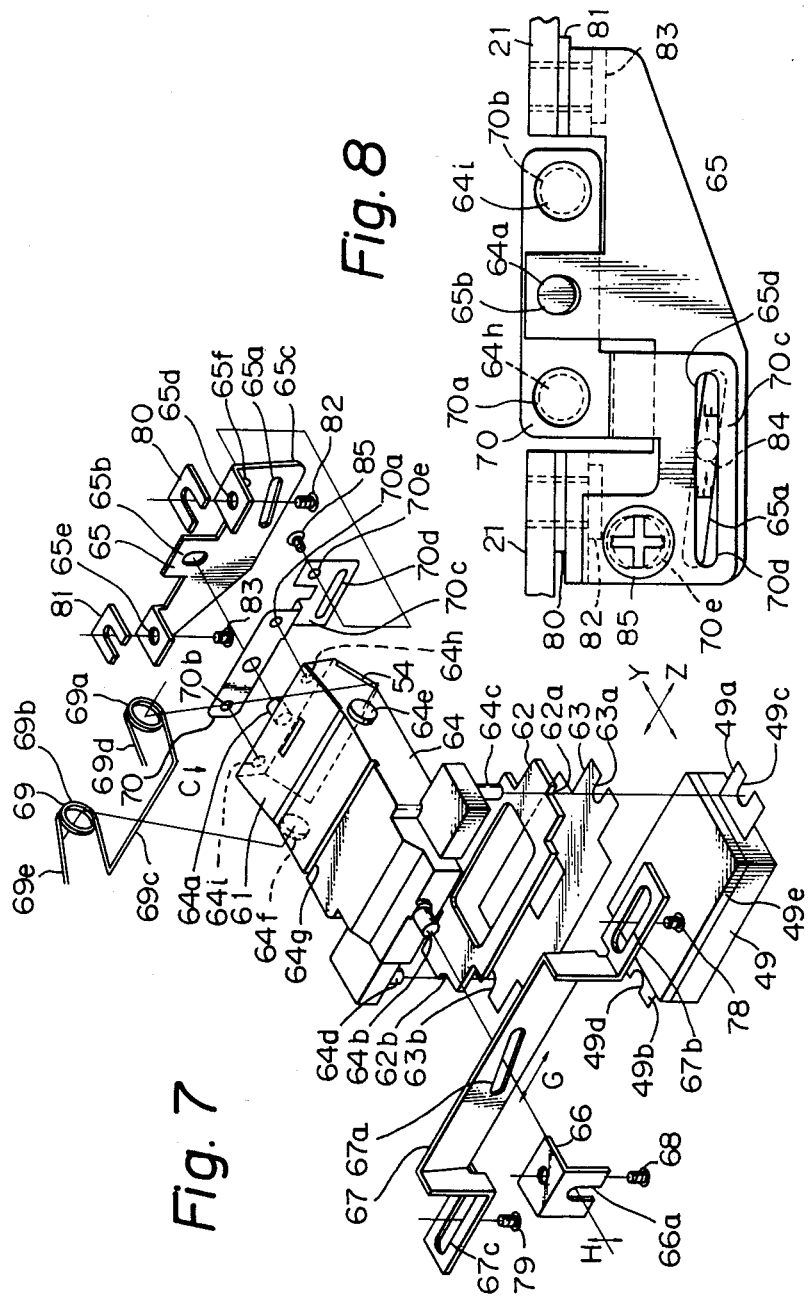

FOCUS DETECTING DEVICE FOR A CAMERA

BACKGROUND OF THE INVENTION

1. Field of the Invention

The present invention relates to a focus detecting device, and more particularly to a focus detecting device for a single-lens reflex type camera for detecting a focusing state of an object lens by sensing an image formed through the object lens.

2. Description of the Prior Art

A focus detecting device of this type has been well known in the art and various methods for detecting a focusing state have been proposed. For example, Japanese Patent Application Laid-Open No. 52-95221 (laid open on Aug. 10, 1977) discloses a method for detecting the focusing state of the object lens based on a relative positional relationship of a plurality of images formed by an optical system by light fluxes transmitted through different areas of a pupil of the object lens by arranging the optical system and sensors for sensing the images behind an anticipated focal plane of the object lens.

The focus detecting device which adopts the above detection method has advantages in that the optical system for forming the images is relatively simple and not only the focusing state of the object lens but also a defocus amount can be detected. On the other hand, since the optical system for forming the images and the sensors for sensing the images must be arranged behind the anticipated focal plane of the object lens, a total length of the device is long. Accordingly, when the focusing state detection device which adopts this detection method is incorporated in a camera to detect the focusing state of the imaging lens, it is difficult to properly mount the optical system and the sensors in the camera body.

A prior art camera having such a focus detecting device is explained below. FIG. 1(a) shows the optical system and the sensors arranged around a pentaprism, which is disclosed in Japanese Utility Model Application Laid-Open No. 57-40919 (laid open on Mar. 5, 1982). Two light fluxes Pa and Pb emitted from a point Q on an object impinge on different areas 101a and 101b of a pupil of an imaging lens 101 and form a primary image Q1 on a focusing screen 103 through a mirror 102. The two light fluxes Pa and Pb transmitted from the image Q1 through the focusing screen 103 pass through a condenser lens 104 and are reflected by a half-mirror 105a of a beam splitter 105, and pass through a spectrum sensitivity correction filter 106 for a detected light and a light distribution means 107 and directed to two secondary focusing lenses 108a and 108b, are reflected by reflection mirrors 109a and 109b and form separate secondary images on detection planes of sensor arrays 110a and 110b. The object light passed upward through the half-mirror 105a is directed to an eye lens 112 through a pentaprism so that the object image can be viewed.

Referring to FIG. 1(b) in which the above example is viewed from the eye lens 112, a detection unit holder 114 is threadedly mounted on a finder 113 to which the focusing screen 103, the condenser lens 104 and the pentaprism 111 are mounted in union. Mirror supports 114a and 114b are formed in union at left and right ends of the unit holder 114, and the reflection mirrors 109a and 109b are bonded to the mirror supports 114a and 114b. A detection optical system unit 115 is attached to the unit holder 114 by a screw 116. The correction filter 106 is bonded to an opening 117 of the unit 115 facing the beam splitter 105. A spacer ring 118 is provided in the unit 115 to hold the secondary focusing lenses 108a and 108b at predetermined positions, and a holding member 119 which is integral with the light distribution means 107 is fixed to the unit 115. Those are located below the eye lens 112 and the two light fluxes Pa and Pb deflected by the half-mirror 105a are directed from the reflection mirrors 109a and 109b to the sensor arrays 110a and 110b located above the eye lens 112. The unit holder 114 and the mirror supports 114a and 114b, the unit holder 114 and the unit 115, the unit 115 and the spacer ring 118, and the spacer ring 118 and the holding member 119 can be relatively position-adjusted.

In this example, since the detection optical system and the sensors are separately supported, the positional relationship of the detection optical system and the sensors varies when the position of the detection optical system is adjusted relative to the imaging lens 101. Accordingly, a number of steps are required to adjust the entire device.

FIG. 2(a) shows another example of the prior art device in which the detection optical system and the sensor are arranged on the bottom of the camera body, which is disclosed in Japanese Patent Application Laid-Open No. 58-54323 (laid open on Mar. 31, 1983). A light flux transmitted through an imaging lens 201 passes through a main mirror 202 and is reflected by a sub-mirror 203 forward-diagonally and downward of the camera body, passes through a field lens 204 and is directed to a reflection mirror 205. At an area A shown in FIG. 2(c), the light flux is reflected backward by the reflection mirror 205 and directed to a beam splitter 206 and split to left and right by reflection planes 206a and 206b of the beam splitter 206 [see FIG. 2(b)]. The light reflected right-diagonally and forwardly by the reflection plane 206a passes through a secondary focusing lens 207, is reflected backward by the reflection mirror 208, is reflected leftward by a reflection mirror 208 and reflected downward by a reflection mirror 210 and focused on a detection plane of a sensor array 211 located at an area B shown in FIG. 2(c). On the other hand, the light reflected leftward by the reflection plane 206b is reflected forward by a prism 212, passes through a secondary focusing lens 213, is reflected rightward by a prism 214, is again reflected downward by a prism 215 and is focused on a detection plane of a sensor array 216.

In this example, the light fluxes from the periphery of the exit plane of the detection optical system, the light fluxes transmitted through the external of the lens of the optical system or the light fluxes reflected by the lens surface may impinge to the sensor as stray light.

In order to incorporate such a focus detecting device in a camera, it is necessary to position the detection optical system and the sensor in the camera body with a predetermined relation to the imaging lens and hence it is necessary to adjustably support the optical system and the sensor in the camera body. The support method is disclosed in Japanese Utility Model Application Laid-Open No. 57-8816 (laid open on May 31, 1982), No. 57-187416 (laid open on Nov. 27, 1982) and Japanese Patent Application Laid-Open No. 58-78128 (laid open on May 11, 1983), in which a sensor block including a sensor or an optical system and the sensor are supported by three or four bolts and the sensor block is urged to the bolts by a spring so that the position of the sensor block is adjusted by the bolts. In this method, however, it is difficult to independently adjust the position of the sensor block in orthogonal X - Y and Z directions and a long time is required for the adjustment.

When such a focus detecting device is incorporated in the camera, it is necessary to pay attention to a relationship between an incident plane of the detection optical system and an imaging plane to prevent a light other than an imaging light from reaching the imaging plane (film plane).

SUMMARY OF THE INVENTION

It is an object of the present invention to provide a focus detecting device which detects a focusing state of an imaging lens based on an image formed by the imaging lens and which can be readily incorporated in a camera body.

It is another object of the present invention to provide a focus detecting device for a camera which can be incorporated compactly at a bottom of a camera body.

It is another object of the present invention to provide a focus detecting device for a camera which allows precise and easy adjustment of positions of units in a camera body.

It is another object of the present invention to provide a focus detecting device for a camera which prevents a stray light to a sensor which senses an image formed by an imaging lens to allow an exact focusing state detection.

It is another object of the present invention to provide a focus detecting device for a camera which does not adversely affect the photographing operation of the camera.

The other objects of the present invention will be apparent from the following description of preferred embodiments.

BRIEF DESCRIPTION OF THE DRAWINGS

FIGS. 1(a) and 1(b) show one example of a prior art focus detecting device for a camera, FIG. 4 shows a sectional view of a sensor block of the embodiment, FIG. 5 schematically shows an optical system of the embodiment, FIG. 6 illustrates adjustment of the sensor block in the embodiment, FIG. 7 is a developed view of a position adjusting mechanism of the sensor block in the embodiment, and FIG. 8 shows a position adjusting mechanism shown in a direction of an arrow D of FIG. 4.

DETAILED DESCRIPTION OF THE PREFERRED EMBODIMENTS

Figure 2A:
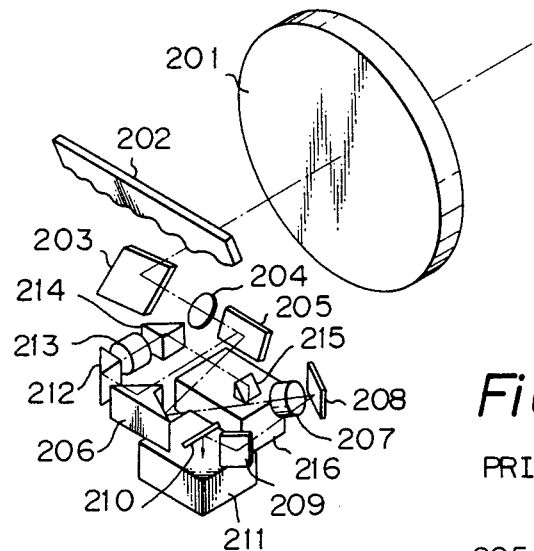
FIGS. 2(a), 2(b) and 2(c) show another example of the prior art focus detecting device.
Figure 2B:
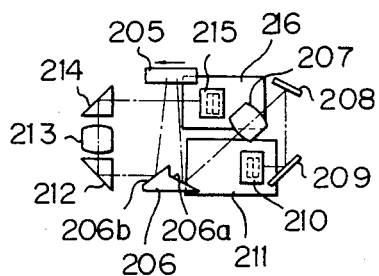
Figure 2C:
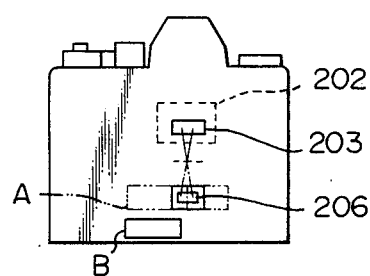
Figure 3A:
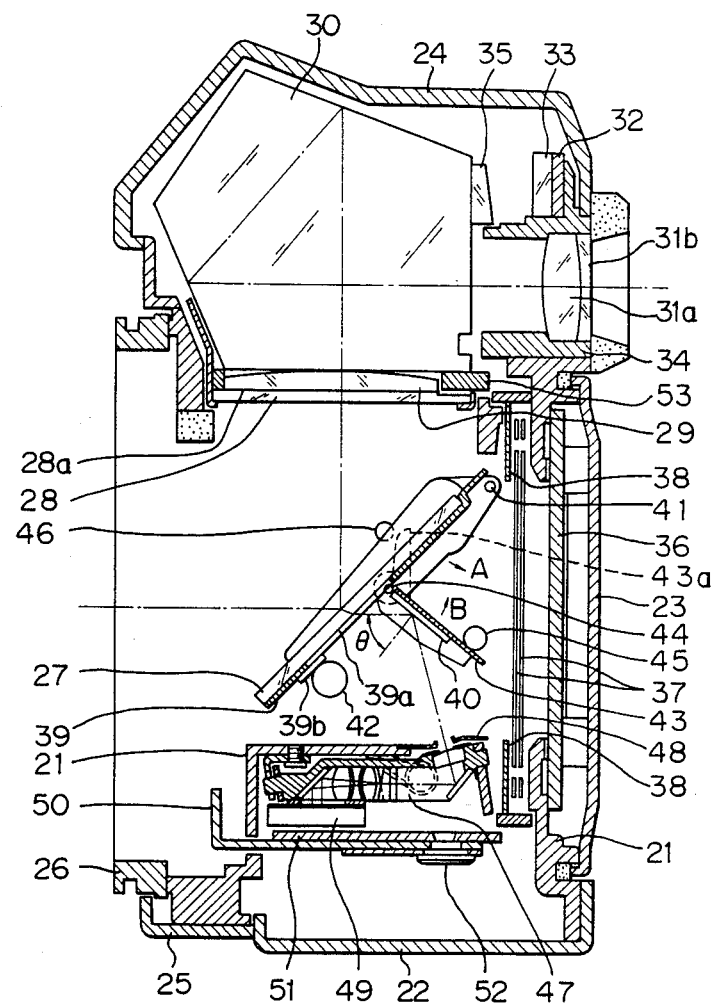
FIGS. 3(a) and 3(b) show one embodiment of a focus detecting device for a camera in accordance with the present invention.
Figure 3B:
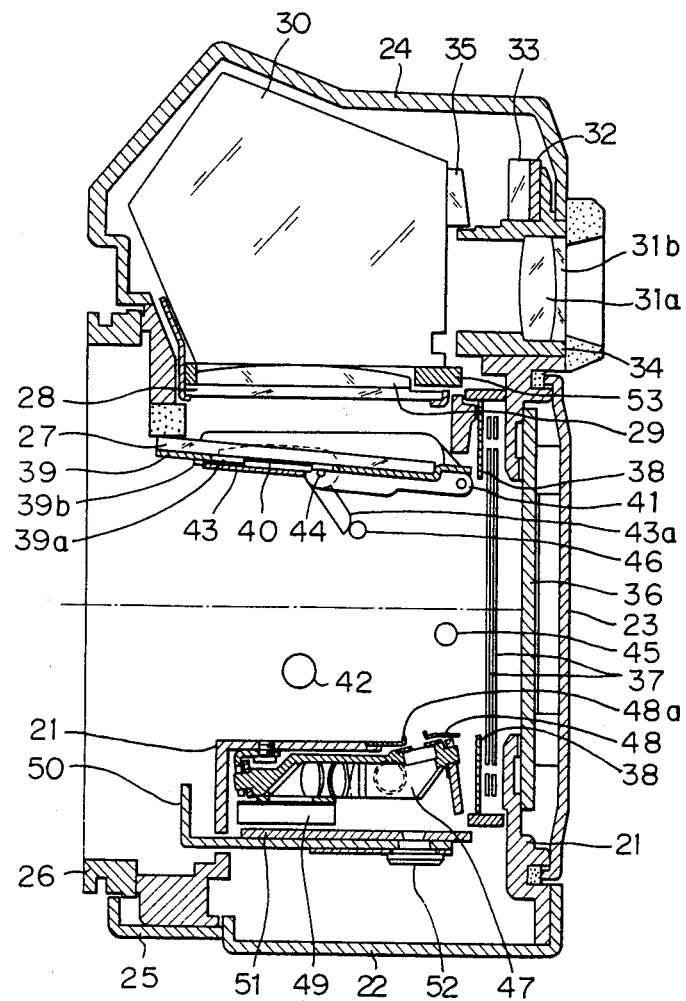

FIGS. 3(a) and 3(b) show an embodiment of the present invention applied to a single-lens reflex type camera. FIG. 3(a) shows a non-photographing mode of the camera and FIG. 3(b) shows a photographing mode of the camera. A camera body is constructed by a bottom cover 22 which enclose a dyecast base 21, a rear cover 23, a top cover 24, a front cover 25 and a lens mount 26 for mounting an imaging lens (not shown). A main mirror 27 for selectively directing a light flux transmitted through the imaging lens to an overlying finder optical system or a photographic film is provided in a center mirror box. A center of the main mirror is a half-mirror.

In the finder optical system, a focusing screen 28, a condenser lens 29, a pentaprism 30 and eye lenses 31a and 31b are arranged in sequence along a light path. A photosensor 32 for measuring an object brightness for an exposure control and a Frenel lens 33 for collecting a light diffused by a mat plane 28a of the focusing screen 28 to the photosensor 32 are fixed at a top of an eye lens frame 34. A prism 35 for setting a peak of a detection sensitivity to a center of an imaging screen is mounted on an exit plane of the pentaprism 30 to face the Fresnel lens 33.

A pressing plate 36 for holding the photographic film on the focal plane, a shutter curtain 37 of a focal plane shutter and an aperture frame 38 are arranged inside of the rear cover 23.

The main mirror 27 at a center of the mirror box is mounted on a main mirror holding frame 39, and an opening for directing a light flux transmitted through the half-mirror to a sub-mirror 40 is formed at a center of the holding frame 39. The holding frame 39 is pivotably supported by a rotation shaft 41 and biased by a spring (not shown) to be rotated in a direction of an arrow A. The rotation is restricted to a position shown in FIG. 3(a) by a stopper 42 which slightly projects into the mirror box. A rubber plate 39b for absorbing a shock in a lifting operation is attached to the holding frame 39 at a position abutting against the stopper 42. A sub-mirror 40 for directing the light flux transmitted through the half-mirror to the focus detecting optical system is arranged behind the main mirror holding frame 39. The sub-mirror 40 is set such that an incident angle $\theta$ of the light passing through an optical axis of the imaging lens is larger than 45 degrees in the position shown in FIG. 3(a). The sub-mirror 40 is fixed to a sub-mirror holding frame 43 and is rotatably supported by a rotation shaft 44 to the main mirror holding frame 39 and biased by a spring (not shown) so that it is rotated in a direction of an arrow B. A stopper 45 defines a stop position of the sub-mirror holding frame 43. A cam 43a is provided at an end of the sub-mirror holding frame 43 facing the rotation shaft 44 such that the cam 43a is slid in contact with an outer peripheral circle of a guide pin 46 as the main mirror 27 is lifted. It is moved to a position shown in FIG. 3(b).

A sensor block 47 having an optical system for forming a plurality of secondary images for in-focus state detection is arranged below the main mirror 27 through a first ghost prevention mask 48 which has a shielding cylinder 48a having a center axis along the light path from the sub-mirror 40 as shown in FIG. 4. A sensor package 49 having a CCD line sensor is attached to a bottom of the sensor block 47. An actuation lever 50 which is linked to an automatic iris lever of the imaging lens, and a plate 51 for holding the actuation lever 50 are arranged below the sensor block 47. The actuation lever 50 is pivotably supported by a calking dowel 52. A focusing state display LED 53 is attached to the bottom of the pentaprism 30.

FIG. 4 shows a sectional view of the sensor block 47 and the adjusting mechanism therefor. A field lens 54, a reflection mirror 55, an infrared ray cut filter 56, an image splitting wedge prism 57, focusing lenses 58a, 58b and 58c for forming secondary images, and a reflection mirror 60 are linearly arranged in sequence along the light path of the light flux from the sub-mirror 40. The image splitting prism 57 and the secondary focusing lenses 58a, 58b and 58c are molded and the image splitting prism 57 is coated with shielding material except an effective area. A second mask 61 is arranged in front of the field lens 54. The mask 61 is positioned on a plane (primary focusing plane) conjugate with the film plane of the camera or in a vicinity thereof. The reflection mirror 55 reflects the light flux from the field lens 54 substantially parallel with the optical axis of the imaging lens. The reflection mirror 60 arranged to face the reflection mirror 55 reflects the light flux from the focusing lens 58c to a normal direction, that is, downward in FIG. 4. The field lens 54 serves to focus the image of the splitting area of the prism 57 in a vicinity of a pupil of the imaging lens. The prism 57 splits the pupil of the imaging lens symmetrically about the optical axis of the imaging lens to vertically split the light flux transmitted through the areas of the pupil. The focusing lenses 58a, 58b and 58c form two secondary images on detection planes of CCD line sensors 76 and 77 arranged in the sensor package 49 based on the split light fluxes. The CCD line sensors 76 and 77 have the same number of pixels, for example, 40 pixels and are arranged normally to the plane of the drawing. The sensor package 49 has a container 49f for accommodating the sensors 76 and 77 and a transparent flat plate 49e which covers an opening of the container 49f.

A spacer 62 for adjusting positions of the CCD line sensors 76 and 77 in the optical axis direction (vertical direction in FIG. 4) and a third mask 63 for preventing stray light are mounted between the sensor block 47 and the sensor package 49. The sensor block 47 is held in union with a unit holding member 64, and shafts 64a and 64b which are parallel to the optical axis of the imaging lens are coaxially and integrally formed at the opposite ends of the unit holding member 64. One shaft 64a is pivotably supported by a bearing plate 65 and the other shaft 64b is pivotably supported by an angle 66 which restricts a movement normal to the plane of the drawing and a sliding plate 67 which restricts a movement parallel to the plane of the drawing. Thus, the holding member 64 is rotatably held around a line connecting the shafts 64a and 64b. The angle 66 is threadedly mounted to the base 21 by a bolt 68. A torsion spring 69 presses the sensor block 47 downward through the holding member 64. The position of the sensor block 47 relative to the pupil plane of the imaging lens can be adjusted by adjusting a positional relationship between a pivot adjusting plate 70 attached to the unit holding member 64 and the bearing plate 65 or a relationship between the angle 66 and the sliding plate 67.

In the embodiment shown in FIGS. 3(a) and 3(b), when the main mirror 27 of FIG. 3(a) is in the descended position, the light flux transmitted through the imaging lens is split so that one portion thereof is directed to the finder optical system by the main mirror 27 and the other portion is directed to the focus detecting optical system. The light flux transmitted through the half-mirror at the center of the main mirror 27 is reflected by the sub-mirror 40 and impinges on the focus detecting system arranged at the bottom of the mirror box. The focus detecting optical system is constructed as a unit of the sensor block 47 as shown in FIG. 4 and the light flux passes through the first mask 48, the second mask 61, the field lens 54, the reflection mirror 55, the infrared ray cut filter 56, the image splitting prism 57, the focusing lenses 58a, 58b and 58c, the reflection mirror 60, the third mask 63 and the sensor package 49 in sequence. A phase difference of the images on the detection planes of the two CCD line sensors 76 and 77 in the sensor package 49 is detected to detect the in-focus state of the imaging lens.

The incident angle $\theta$ of the light passing through the optical axis of the imaging lens, to the sub-mirror 40 is larger than 45 degrees, and the shielding cylinder 48a for preventing the ghost created by the incidence of the light reflected by the surface of the field lens 54 to the photographic film is provided in the first mask 48. Accordingly, the opening of the focus detecting optical system may be arranged closely to the aperture frame 38 at the bottom of the mirror box so that the focus detecting optical system can be effectively arranged.

As the main mirror holding frame 39 is lifted up against the biasing force in the direction A shown in FIG. 3(a) by actuation of a shutter release (not shown), the guide pin 46 and the cam 43a of the sub-mirror holding frame 43 abut and slide, and as the main mirror holding frame 39 is further lifted up, the sub-mirror holding frame 43 is rotated in the opposite direction to the direction B in FIG. 3(a). When the lifting of the main mirror holding frame 39 is completed, the sub-mirror 40 is folded as shown in FIG. 3(b) and the imaging light flux reaches the shutter curtain 37 without being shielded. The sub-mirror holding frame 43 blocks the opening 39a of the main mirror holding frame 39 to prevent the incidence of the light from the finder optical system into the mirror box.

FIG. 5 is a perspective view of the focus detecting optical system. The infrared ray cut filter 56, the molded image splitting prism 57 and the secondary focusing lenses 58a, 58b and 58c are formed in rectangle having a center effective view field. Upper sides of the rectangles and edges orthogonal to the upper sides are finished into a precise plane which serves as a reference plane when it is assembled into the holding member 64. Numeral 28a denotes a mat plane of the focusing screen 28 and numeral 71 denotes an image on the photographic film.

FIG. 6 illustrates the operation of the position adjusting mechanism of the focus detecting optical system. It is shown differently from an actual arrangement. An iris 72 is provided behind the image splitting prism 57 and two rectangular openings 72a and 72b are formed on the opposite sides of the optical axis of the imaging lens. The images 74 and 75 of the openings 72a and 72b formed when the iris 72 is projected by the field lens 54 exist on the exit pupil 73 of the imaging lens. Deviated images 74' and 75' formed due to a positional deviation of the iris 72, or a parallel eccentricity or inclination of the optical axis of the imaging lens and the optical axis of the focus detecting optical system are shown. The light flux transmitted through the iris opening 72a forms the secondary image on the CCD line sensor 76, and the light flux transmitted through the other iris opening 72b forms the secondary image on the line sensor 77. The focusing state can be detected by detecting a phase difference between the output signals from the CCD line sensors 76 and 77.

The light fluxes directed to the iris openings 72a and 72b pass through the areas of the images 74 and 75 of the iris opening on the exit pupil 73 of the imaging lens. Accordingly, the illumination levels of the CCD line sensors 76 and 77 are equal. However, for the deviated images 74' and 75', the illumination levels on the CCD line sensors 76 and 77 are different. When the levels of the two images are different, the phase difference cannot be detected and the detection of the focusing state is impossible or a detection error may be created. Thus, the projection position of the iris 72 onto the exit pupil 73 must be exact and hence the adjusting mechanism is essential because of a limit of the manufacturing precision of the components.

FIG. 7 is a developed perspective view of the adjusting mechanism of the sensor block 47. Metal wings 49a and 49b are provided on the opposite sides of the sensor package 49 which contains the CCD line sensors 76 and 77, and notches 49c and 49d are formed with respect to the CCD line sensors 76 and 77. Sensor positioning pins 64c and 64d integrally formed at the bottom of the unit holding member 64 located above the sensor package 49 project downward so that the spacer 62, the third mask 63 and the CCD line sensors 76 and 77 are positioned in the Y - Z direction relative to the unit holding member 64 by the pins 64c and 64d, the notches 62a and 62b of the spacer 62, the notches 63a and 63b of the third mask 63 and the notches 49c and 49d of the sensor package 49. The CCD line sensors 76 and 77 can be adjusted in the focusing direction by changing the thickness of the spacer 62.

Embosses 64e and 64f are formed on the opposite sides of the unit holding member 64. By inserting a torsion spring 69 in a direction C, coils 69a and 69b fall into outer peripheries of the embosses 64e and 64f and are coupled therewith. A connecting portion 69c of the torsion spring 69 fits to a groove 64g of the unit holding member 64. The sliding plate 67 has a diagonal slot 67a to which a shaft 64b of the unit holding member 64 is pivotably and slidably fitted and slots 67b and 67c for bolting. The shaft 64b is inserted into the slot 67a and the notch 66a of the angle 66 and held rotatably, and the sliding plate 67 is fixed to the base 21 by securing bolts 78 and 79.

The pivotable adjusting plate 70 to be inserted to the shaft 64a of the unit holding member 64 is secured to the unit holding member 64 by fitting calking dowels 64h and 64i of the unit holding member 64 to calking holes 70a and 70b and thermally calking them. The pivot adjusting plate 70 is made of a resilient metal plate, and an adjusting diagonal slot 70d and a locking hole 70e are formed in an adjusting step 70c. The pivoting position around the shaft 64a is adjusted by the adjusting diagonal slot 65a of the bearing plate 65 and the adjusting slot 70d of the pivotable adjusting plate 70.

FIG. 8 shows a detail of this portion as viewed in the direction D shown in FIG. 4. The shaft 64a of the unit holding member 64 is rotatably inserted into the longitudinally elongated slot 65b of the bearing plate 65, and the step 70c of the pivot adjusting plate 70 contacts to the plane 65c of the bearing plate 65. The bearing plate 65 has bolting holes 65d and 65e and is fixed to the base 21 by bolts 82 and 83 through focus adjusting plates 80 and 81.

The position adjustment of the sensor block 47 must be effected in three directions, that is, the X direction shown in FIG. 6 or the direction of incidence of the light flux to the sensor block 47 shown in FIG. 4, the rotation around the Y direction shown in FIG. 6 or the rotation of the unit holding member 64 in FIG. 7 around the shafts 64a and 64b, and the rotation around the Z axis shown in FIG. 6 or the vertical movement of the shaft 64b in FIG. 7. The X-direction adjustment is effected by changing the thicknesses of the focus adjusting plates 80 and 81. The pivot around the y-axis is effected by the mechanism shown in FIG. 8. An adjusting jig 84 is inserted into a widest position of the slit formed by the adjusting slot 70d of the pivot adjusting plate 70 and the adjusting diagonal slot 65a of the bearing plate 65 and it is moved in a direction E or F so that the sensor block 47 is pivoted around the shafts 64a and 64b. After the adjustment, the bolt 85 is inserted in the locking hole 65f of the bearing plate 65 and the locking hole 70e of the pivot adjusting plate 70 to secure the sensor block 47. The pivot adjusting around the Z-axis is effected by moving the sliding plate 67 having the shaft 64b fitted to the diagonal slot 67a, in the direction G. Since the shaft 64b of the unit holding member 64 is fitted to the notch 66a extending in the direction H in the angle 66, it is moved only in the direction H. Since the torsion spring 69 is charged, the sensor block 47 is always urged downward. Accordingly, no backlash due to the slot 65a formed to permit the movement of the shaft 64b in the direction H is created. Since the pivot adjusting plate 70 is made of a resilient metal, the pivot adjustment around the Y-axis and the pivot adjustment around the Z-axis can be independently effected without interference.

As described hereinabove, in accordance with the present invention, the focus detecting device can be readily incorporated in the camera body.

What is claimed is:

1. A focus detecting device for a camera for detecting a focusing state of an imaging lens comprising:
   first reflection means for reflecting a light flux from the imaging lens toward a bottom of a camera body;
   second reflection means for reflecting a light flux from said first reflection means in a direction substantially parallel to an optical axis of the imaging lens;
   third reflection means for reflecting the light flux from said second reflection means in a direction substantially normal to the optical axis of the imaging lens;
   optical means for forming an image variable in accordance with a focusing state of the imaging lens based on the light flux transmitted through the imaging lens, said optical means being arranged between said second and third reflection means along the direction of reflection of the light flux by said second reflection means;
   sense means for sensing the image formed by said optical means to produce a signal for detecting the focusing state of the imaging lens, said sensing means being arranged along the direction of reflection of the light flux by said third reflection means.

2. A focus detecting device for a camera according to claim 1 wherein said second reflection means is arranged such that a focal plane conjugate with an imaging plane of the camera is located between said first and second reflection means.

3. A focus detecting device for a camera according to claim 2 wherein a lens means is arranged in a vicinity of said focal plane in order to maintain a predetermined relationship between a pupil of the imaging lens and a pupil of said optical means.

4. A focus detecting device for a camera according to claim 3 wherein a cylindrical light shielding means is arranged along the direction of reflection of the light flux by said first reflection means in a vicinity of said lens means.

5. A focus detecting device for a camera according to claim 4 wherein said light shielding means prevents the light flux transmitted from the imaging lens and reflected by said lens means from reaching the imaging plane of the camera.

6. A focus detecting device for a camera according to claim 3 wherein said first reflection means is set such that an incident angle of the light flux along the optical axis of the imaging lens is larger than 45 degrees.

7. A focus detecting device for a camera according to claim 6 wherein a cylindrical light shielding means is arranged in a vicinity of said lens means along the direction of reflection of the light flux by said first reflection means.

8. A focus detecting device for a camera according to claim 7 wherein said light shielding means prevents the light flux transmitted through the imaging lens and reflected by said lens means from reaching the imaging plane of the camera.

9. A focus detecting device for a camera according to claim 1 wherein a mask means for preventing non-effective light flux from said optical means from reaching a detection plane of said sensing means is arranged between said third reflection means and said sensing means.

10. A focus detecting device for a camera according to claim 1 wherein said optical means and said sensing means are constructed in a unit through holding means for holding said optical means.

11. A focus detecting device for a camera according to claim 10 wherein said holding means holds said second and third reflection means.

12. A focus detecting device for a camera according to claim 11 wherein said holding means holds said sensing means to permit adjustment of a relationship between said optical means and said sensing means.

13. A focus detecting device for a camera according to claim 12 wherein said holding means is supported to allow adjustment of a pass area in a pupil of the imaging lens, of the light flux applied to said optical means.

14. A focus detecting device for a camera for detecting a focusing state of an imaging lens comprising:
reflection means for reflecting a light flux from an imaging lens toward a bottom of a camera body;
optical means for forming an image variable in accordance with a focusing state of the imaging lens based on the light flux from the imaging lens through said reflection means, said optical means being arranged such that a focal plane conjugate with an imaging plane of the camera is located between said optical means and said reflection means;
sense means for sensing the image formed by said optical means to produce a signal for detecting the focusing state of the imaging lens;
lens means arranged in a vicinity of the focal plane for maintaining a predetermined relation between a pupil of the imaging lens and a pupil of said optical means; and
light shielding means for preventing the light flux transmitted from the imaging lens and reflected by said lens means from reaching the imaging plane of the camera, said light shielding means being cylindrical along the direction of reflection of the light flux by said reflection means.

15. A focus detecting device for a camera according to claim 14 wherein said reflection means is set such that an incident angle of the light flux along the optical axis of the imaging lens is greater than 45 degrees.

16. A focus detecting device for a camera according to claim 15 wherein said light shielding means is fixedly arranged near said lens means.

17. A focus detecting device for a camera for detecting a focusing state of an imaging lens comprising:
reflection means for reflecting a light flux from the imaging lens toward a bottom of a camera body;
optical means for forming an image variable in accordance with a focusing state of the imaging lens based on the light flux transmitted from the imaging lens through said reflection means;
sense means for sensing the image formed by said optical means to produce a signal for detecting the focusing state of the imaging lens; and
holding means for holding said optical means and said sense means in union, said holding means supporting said sense means to allow adjustment of a relationship between said optical means and said sense means.

18. A focus detecting device for a camera according to claim 17 wherein said holding means supports said sense means to allow adjustment of an optical path length to said optical means.

19. A focus detecting device for a camera according to claim 18 wherein said holding means supports said sense means to allow adjustment of an attitude of said sense means to said optical means.

20. A focus detecting device for a camera according to claim 17 wherein said holding means is supported to allow adjustment of a pass area in the pupil of the imaging lens, of the light flux applied to said optical means.

21. A focus detecting device for a camera according to claim 20 wherein said holding means supports said optical means to allow rotation around a first axis substantially normal to the optical axis of said optical means and a second axis substantially normal to the optical axis of said optical means and to said first axis.

22. A focus detecting device for a camera for detecting a focusing state of an imaging lens comprising:
reflection means for reflecting a light flux from the imaging lens toward a bottom of a camera body;
optical means for forming an image variable in accordance with a focusing state of the imaging lens based on the light flux transmitted from the imaging lens through said reflection means;
sense means for sensing the image formed by said optical means to produce a signal for detecting the focusing state of the imaging lens;
holding means for holding said optical means and said sense means in union, said holding means rotatably supported around a shaft;
first adjusting means for adjusting a rotation angle of said holding means around the shaft to adjust a pass area in a first direction in a pupil of the imaging lens, of the light flux and applied to said optical means; and
second adjusting means for adjusting an inclination of the shaft of said holding means to adjust the pass area in a second direction substantially normal to the first direction.

23. A focus detecting device for a camera according to claim 22 wherein said first adjusting means is arranged at one end of the shaft and said second adjusting means is arranged at the other end of the shaft.

24. A focus detecting device according to claim 23 wherein said first adjusting means restricts the rotation of said holding means through a resilient member.

* * * * *